United States Patent
Brown

(10) Patent No.: US 10,023,397 B1
(45) Date of Patent: Jul. 17, 2018

(54) MONITORING THE SPEED OF A BELT

(71) Applicant: REGAL CONSTRUCTION, INC., Vincennes (IN)

(72) Inventor: Terry Michael Brown, Vincennes, IN (US)

(73) Assignee: REGAL CONSTRUCTION, INC., Vincennes, IN (US)

( * ) Notice: Subject to any disclaimer, the term of this patent is extended or adjusted under 35 U.S.C. 154(b) by 0 days.

(21) Appl. No.: 15/934,366

(22) Filed: Mar. 23, 2018

Related U.S. Application Data

(60) Provisional application No. 62/598,780, filed on Dec. 14, 2017.

(51) Int. Cl.
*B65G 43/10* (2006.01)
*B65G 43/08* (2006.01)
*B65G 43/06* (2006.01)

(52) U.S. Cl.
CPC ............. *B65G 43/10* (2013.01); *B65G 43/06* (2013.01); *B65G 43/08* (2013.01); *B65G 2203/0291* (2013.01)

(58) Field of Classification Search
CPC ................................ B65G 43/06; B65G 43/08
USPC ........... 198/502.1, 502.2, 502.4, 617, 810.03
See application file for complete search history.

(56) References Cited

U.S. PATENT DOCUMENTS

| | | | | |
|---|---|---|---|---|
| 4,809,576 A * | 3/1989 | Bakermans | .......... | B21D 28/002 198/502.1 |
| 6,047,814 A * | 4/2000 | Alles | ...................... | B65G 43/02 198/502.1 |
| 6,497,320 B2 * | 12/2002 | Kondo | ..................... | B65B 65/02 198/341.01 |
| 6,851,546 B2 * | 2/2005 | Lodge | ..................... | G01B 7/046 198/502.1 |
| 7,395,913 B1 * | 7/2008 | Canapa | ................... | B65G 67/08 198/312 |
| 7,779,994 B1 * | 8/2010 | Travis | ..................... | B65G 43/02 198/810.01 |
| 7,898,674 B2 * | 3/2011 | Wyble | ...................... | G01D 5/30 356/614 |
| 8,285,494 B2 * | 10/2012 | Vozner | .................. | G01B 11/028 198/502.1 |
| 8,657,105 B2 * | 2/2014 | Twigger | ................. | B65G 43/06 198/502.1 |

(Continued)

*Primary Examiner* — Douglas A Hess
(74) *Attorney, Agent, or Firm* — Oliff PLC; R. Brian Drozd

(57) ABSTRACT

Systems and methods for controlling belt speed are provided. In one embodiment, a control system includes a driving mechanism configured to move a belt in a longitudinal direction, the belt having support portions separated from each other by gaps. The control system includes a sensing apparatus configured to optically detect the presence of the support portions and gaps when the belt is moved in the longitudinal direction. A processing device is configured to receive a detection signal from the sensing apparatus that is indicative of the presence of the support portions and gaps. The processing device is further configured to monitor belt speed based on a number of gaps detected over a predetermined amount of time. A controller is configured to receive control signals from the processing device and control the operation of the driving mechanism based on the number of gaps detected over the predetermined amount of time.

20 Claims, 8 Drawing Sheets

(56) References Cited

U.S. PATENT DOCUMENTS 9,746,385 B2 *  8/2017  Kar ........................ G01H 11/08
9,776,799 B2 * 10/2017  Ulchak .................. B65G 17/08

* cited by examiner

MONITORING THE SPEED OF A BELT

BACKGROUND

Food handling facilities utilize many different types of machines to transport food and keep the food at a proper temperature during transport throughout the facility. The food handling facilities may be configured to produce and transport many different types of foods, such as frozen dinners, frozen chicken, pizzas, and other food products.

In many food handling facilities, spiral conveyor systems may be used. Spiral conveyor systems are designed to freeze/cool/heat-proof many different food items. They may run for many hours every day to keep up with production and may sometimes run 24/7 for weeks at a time. Many companies do not want to shut these machines down unless it is absolutely necessary. In the long run, however, problems with the spiral conveyor system machine may result in the machine being down for days at a time.

Many machines used in these facilities, such as the spiral conveyor systems, may need maintenance on a regular basis since machine down-time can result in a loss of both time and food products. Since machinery is often checked infrequently (e.g., once a month), it may be difficult to predict when machines in the food handling facility may fail and/or when adjustments will be needed. Although more frequent maintenance checks can be made, the added cost to companies may be an obstacle.

Sensors and gauges may be installed to sense various parameters of the food handling machinery. Theses sensors and gauges are read manually by a maintenance technician, who can then perform any needed maintenance on the machinery. However, if the equipment is checked infrequently, a machine may require maintenance or required an adjustment in between maintenance calls. Also, very few people have a working knowledge of the facilities and can provide proper maintenance when needed. Therefore, a need exists for food manufacturing companies to monitor food processing equipment continually and automatically make adjustments when needed.

SUMMARY

The present disclosure is directed to systems and method of monitoring and controlling the speed of a belt of a conveyor system. In one embodiments, a control system includes a driving mechanism configured to move a belt in a longitudinal direction. The belt may comprise a plurality of support portions separated from each other by a plurality of gaps. The control system also includes a sensing apparatus configured to optically detect the presence of the support portions and gaps when the belt is moved in the longitudinal direction. The control system also includes a processing device configured to receive a detection signal from the sensing apparatus, wherein the detection signal is indicative of the presence of the support portions and gaps. The processing device is further configured to monitor the speed of the belt based on a number of gaps detected over a predetermined amount of time. A controller is configured to receive control signals from the processing device and control the operation of the driving mechanism based on the number of gaps detected over the predetermined amount of time.

According to another embodiment, a system for detecting the speed of a belt having a plurality of support portions separated from each other by a plurality of gaps is provided. The system in this embodiments includes a sensing apparatus configured to optically detect the presence of the support portions and gaps when the belt is moved in a longitudinal direction and a processing device configured to receive signals from the sensing apparatus indicative of the presence of the support portions and gaps, the processing device further configured to count the number of gaps detected over a predetermined amount of time. The processing device is further configured to determine the speed of the belt based on the number of gaps detected over the predetermined amount of time.

In yet another embodiment, a method for monitoring a belt comprises a step of optically detecting the presence of support portions and gaps of a belt when the belt is moved in a longitudinal direction. The method also comprises the step of counting the number of gaps detected over a predetermined amount of time. Also, the method includes determining the speed of the belt based on the number of gaps detected over the predetermined amount of time.

DETAILED DESCRIPTION

Each food handling facility includes machinery or other equipment that is used within the food handling facility for producing food products, transporting the food products, maintaining a temperature of the food products, etc. For example, some pieces of equipment of the machinery/equipment may include conveyor systems, spiral conveyors, conveyor belts, refrigeration systems, refrigeration fans, motors for moving drums, motors for moving towers, etc. Other machinery/equipment may be used for handling food products, as will be known in the art.

The conveyor belt system may be used for conveying food products throughout the food handling facility. A spiral conveyor system or "spiral" is a belt system that has one continuous belt or a sequence of belts that form an upward or downward directed spiral. For instance, in a downward spiral belt, the food enters at a top of the spiral and is conveyed downward in a spiral fashion. For example, when food is cooked and needs to cool off for a predetermined length of time, the food can be conveyed in a refrigerated spiral conveyor system and remains cool during the conveying process before the food is packaged.

Regarding the belts of the spiral conveyor system, the managers or administrators at a food handling facility may normally want to maintain the speeds of the belts within predetermined thresholds. If a belt slows down, the systems of the present application provide automatic control to increase the speed of the belt to stay within the predetermined thresholds. Therefore, by monitoring the belt speed continually, speed control processes can be performed automatically.

Figure 1:
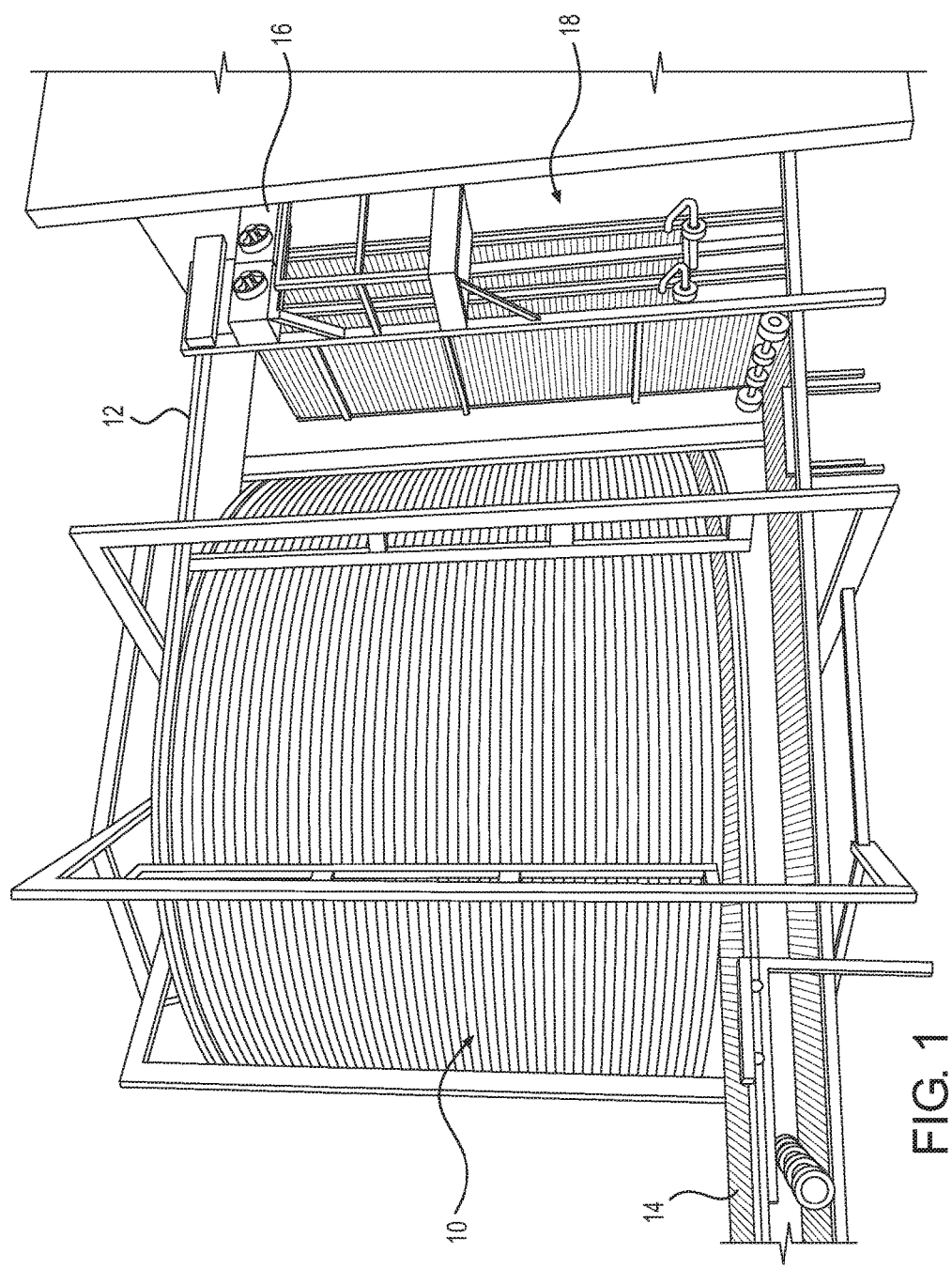
FIG. 1 is a diagram illustrating a perspective view of a spiral conveyor system, according to one embodiment.

FIG. 1 is a diagram of a spiral conveyory system 10, which may be configured as a down-running spiral and has a layout that transports food in a downward spiral direction. An input conveyor 12 or "in-feed" is where the food product comes in and an output conveyor 14 or "out-feed" is where the food product goes out. The spiral 10 includes a cage or drum, which pulls the belt. A tension tower motor and gearbox 16 are configured to operate with a tension tower 18, which is configured to store the belt slack.

Sensors can also be installed for monitoring parameters of the belt, such as an overdrive parameter. On the spiral conveyor system 10, the main drive gearbox and motor 16 has a center shaft installed into the gearbox and a drum mounted to the center shaft. The gearbox turns the shaft, which turns the drum. First, an "ideal/mathematical" rotational speed of the drum can be calculated. In order to do this, the sensor may be used to detect the speed of the motor. The ratio of the gearbox and the radius of the drum are known parameters.

A laser sensor may be installed above the outside of the belt, on the top beam of the spiral. The laser sensor counts the amount of openings in the belt in a given time. This will allow the software on the facility computer or maintenance computer system to calculate the belt speed for the outside of the belt. The difference of the belt speed and the "ideal" rotational speed of the drum equals the overdrive. If the belt slows down, a signal can be sent to the drum to increase its speed to get the belt back into its normal settings. Sensed parameters can be determined as being average (or within a range of an average) or being out-of-spec.

The tension tower 18 of the spiral conveyor system 10 is a device that provides the slack of the belts. The tension tower drives the belt to keep it tight against the drum so that the drum can properly drive the belt, which is the reason that the drum operates faster than the belt. Adjustments can be made to the drum to make sure the belt has the correct tightness or tension.

Figure 2:
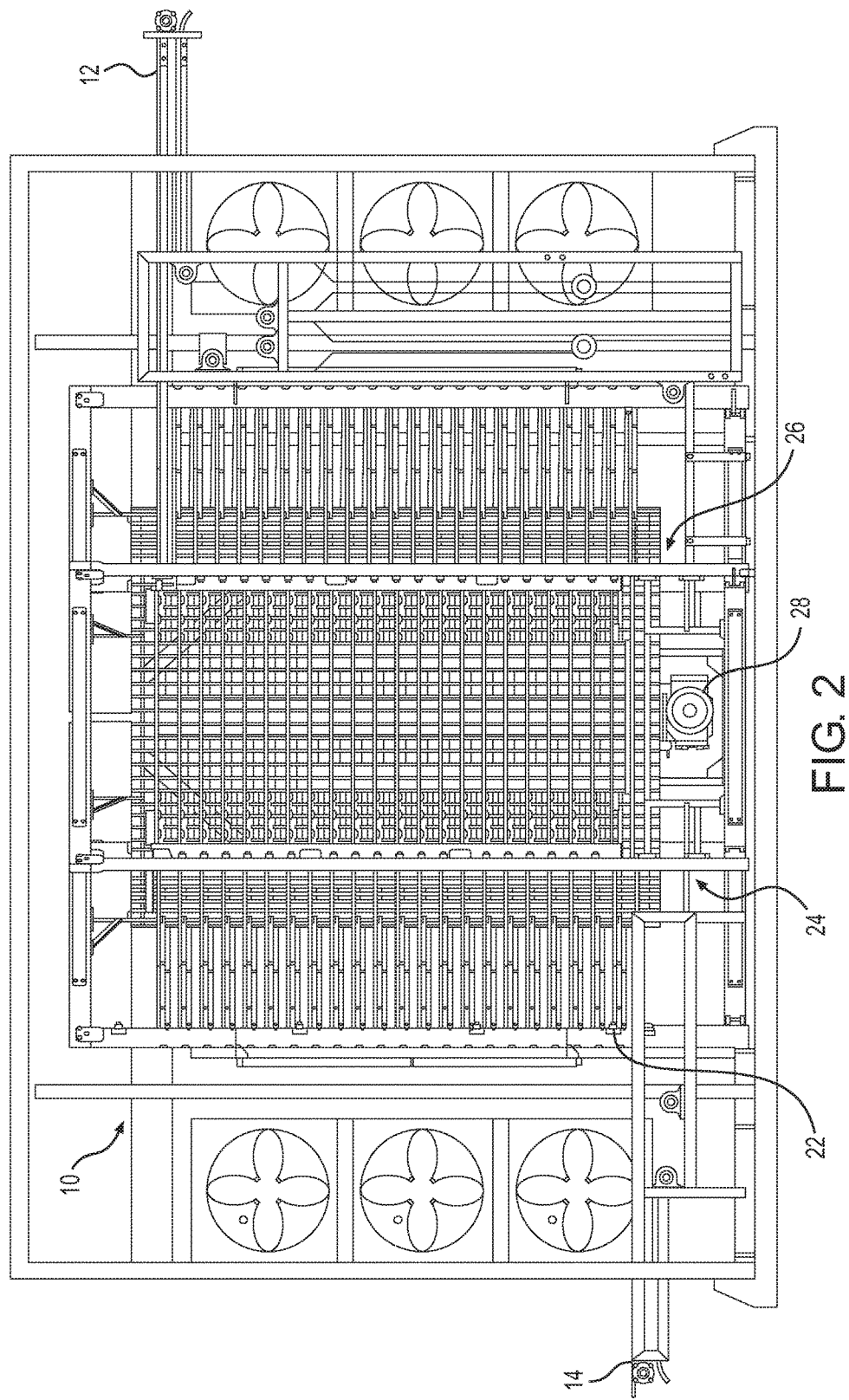
FIG. 2 is a schematic diagram illustrating a side view of the spiral conveyor system of FIG. 1 and location of sensors, according to one embodiment.

FIG. 2 is a schematic diagram showing a side view of the spiral conveyor system 10 along with the location of various sensors. For example, some of the sensors associated with the spiral conveyor system 10 may include a top bearing sensor, a belt flip sensor 22, a vibration sensor for a bottom bearing 24, a vibration sensor for a main drive gearbox 26, and a vibration sensor for a main drive motor 28. Sensors associated with components 26 and 28 may detect frequency (in Hertz) of the vibration.

Conventionally, a maintenance technician may inspect the spiral conveyory system 10 within the food handling facility to determine if it is operating properly. However, in the present application, sensors are installed throughout the food handling facility for sensing various operational parameters of the machinery. Some sensors may be related to determining parameters related to the belt of the spiral conveyor system 10, such as belt speed, belt slippage, belt slack, belt flip, overdrive, etc.

An overdrive condition refers to a condition when a drum, configured to outrun a belt by a certain amount, is not operating with a correct tension. For example, a belt may have a width of 36 inches and a cage of the drum may be configured to outrun the belt by 51 inches. The difference in distance can be measured to determine overdrive. The drum includes a number of bars. A sensor can be set up next to the bars, so that when the belt comes around, a distance can be measured to determine how far the drum is ahead of the belt.

Belt position is another factor that is monitored. If a belt gets out of alignment, the belt system may tear the belt apart, causing many problems. In some instances, a torn belt may shut the entire operation down for days until it can be fixed.

The drum speed and belt speed are normally based on the electrical frequency (in Hertz) and the electrical current (in Amps) applied to the system. However, the frequency and current can also be monitored to determine if a spike in current occurs, which can be an indication of a problem, such as an obstruction in the system that is keeping the belt from moving properly. When a current spike is detected, an alert can be provided. In some systems, an automatic shut-down switch may be used to shut the conveyor system down when a problem is detected, such as a current spike. However, if such a switch is not installed, the sensors for monitoring frequency and current can be used to provide an alert.

From the sensed parameters obtained, software running on a computer in the facility can determine, based on predetermined thresholds, whether a machine is operating outside of those thresholds. With respect to belt speeds, the computer can be configured to control a driver to change the speed as needed to keep the belt speed within acceptable tolerances.

In some embodiments, remote servers may be configured to monitor aspects such as belt speed and provide control signals to the food handling facilities to control the operation of the machinery as needed. For example, if a measured parameter indicates that a certain machine should operate at a slower speed to prevent damage to or failure of the machine, the server can remotely control the machine to run at a slower speed. In other embodiments, a maintenance expert may be required to communicate with a person at the food handling facility to make adjustments to the machines as needed to prevent damage or failure. In still other embodiments, the maintenance expert may visit the facility or deploy another expert who may be in or near the facility to make any necessary adjustments or maintenance actions.

When equipment is detected as being out-of-spec, an alert can be communicated to a computer at the food handling facility or at a central monitoring station where the remote server may be located. Alerts can be communicated automatically or manually by email, text message, phone message, or by other suitable communication methods. In some cases, a response communication can be provided automatically or manually from the central monitoring station back to the food handling facility. The response communication may include a solution to a problem and can be sent via email, text, phone, or other methods.

Figure 3:
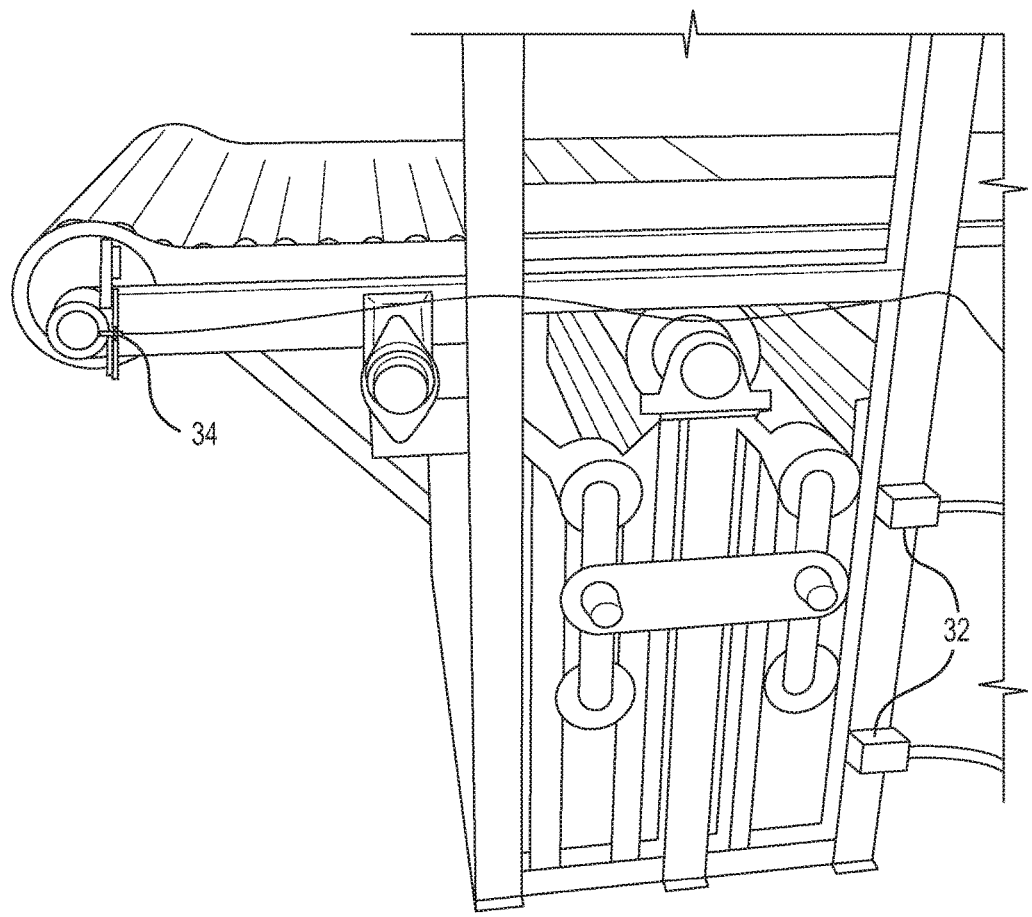
FIG. 3 is a diagram illustrating a perspective view of a belt of the spiral conveyor system where belt slack and belt speed are monitored, according to one embodiment.

FIG. 3 shows belt slack loop sensors 32, which can be used to alert technicians when a problem is detected. The alerts can be communicated on a control panel connected to the sensors, or, in some embodiments, may be provide via phones or computers. The belt slack loop sensors 32 may be proximity switches. When a roller of the conveyor system contacts the proximity switch, the machine may be shut down. On some occasions, maintenance workers may void the proximity switch to prevent the machine from shutting down, even when it may be necessary to do so. Unfortunately, this may result in serious damage to the machine if a problem does arise.

Also, a belt speed sensor 34 may be installed. The sensor 34 may be used to alert technicians by phones/computers (in addition to the control panel connected to this unit). The belt speed sensor 34 can measure belt speed as follows: A cylindrical proximity sensor may be used to measure how many times a shaft spins. This number is then used with the circumference of the shaft to find the distance traveled. Belt speed can be calculated by taking the distance traveled and divide that by time. The belt speed is usually calculated in the units of feet per minute.

A proximity sensor may also be used for a belt flip sensor (not shown). A rod goes up each layer of the belt on the spiral conveyor system 10. If the belt starts to rise, it will lift the rod until it contacts or leaves (disconnects from) the proximity sensor (depending on the type of proximity sensor in use) which causes the proximity sensor to switch the machine off or provide an alarm.

Figure 4:
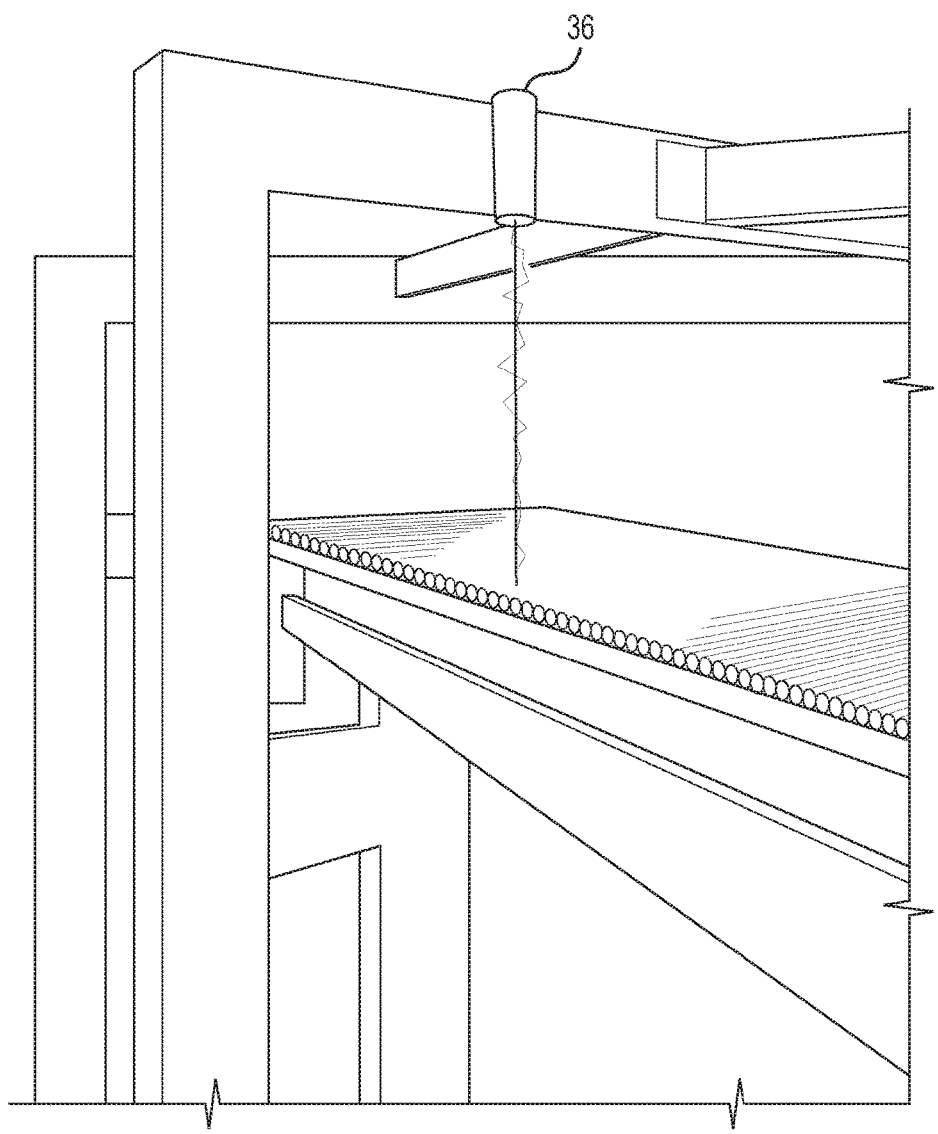
FIG. 4 is a diagram illustrating a perspective view of a belt of the spiral conveyor system where an overdrive condition is monitored, according to one embodiment.

FIG. 4 shows a laser sensor used to detect overdrive. According to some embodiments, overdrive can be determined using a laser 36 located on an outer edge of the system next to the belt. The laser 36 can be used to count the number of gaps in the belt. Based on knowledge of the belt system, the monitoring system will know how many gaps per minute should be normal. If the gap count is below a predetermined number, that is, when the belt slows down, a signal may be provided to indicate that the belt speed needs to be increased by speeding up the drum. This can be done electronically from the remote location of the central monitoring station.

This is an improvement over conventional systems in which the belt speed is set and left at that speed until it may be checked again in a week or so. However, since the belt may get tighter as the days pass, it is important to continually monitor the belt speed, as is done in the present invention. Also, this allows the cage speed to be constantly readjusted, as needed, to maintain a proper speed.

Regarding belt flip sensors, if a belt has already flipped, it is probably too late to avoid damage to the belt or the conveyor system. In conventional systems, this condition is usually not detected. Even when belt condition is monitored manually, there is usually no warning of the condition. Therefore, a company may have a flipped belt without knowing it. The machine may even shut down without the company's knowledge. With the belt flip sensor of the present application, a detection can be made right away to prevent additional damage to the system or food products.

Before the belt flips, another sensor (e.g., laser sensor) is configured for counting the gaps in a belt, which can tell that the belt is getting tighter and is slowing down. When the belt slows down, it gets tighter. When it gets too tight, it is more likely to flip. When too tight, a signal can automatically be sent to the drum to speed up, which should correct the problem and avoid damage. Therefore, some sensors can detect before the belt flip condition occurs.

Figure 5:
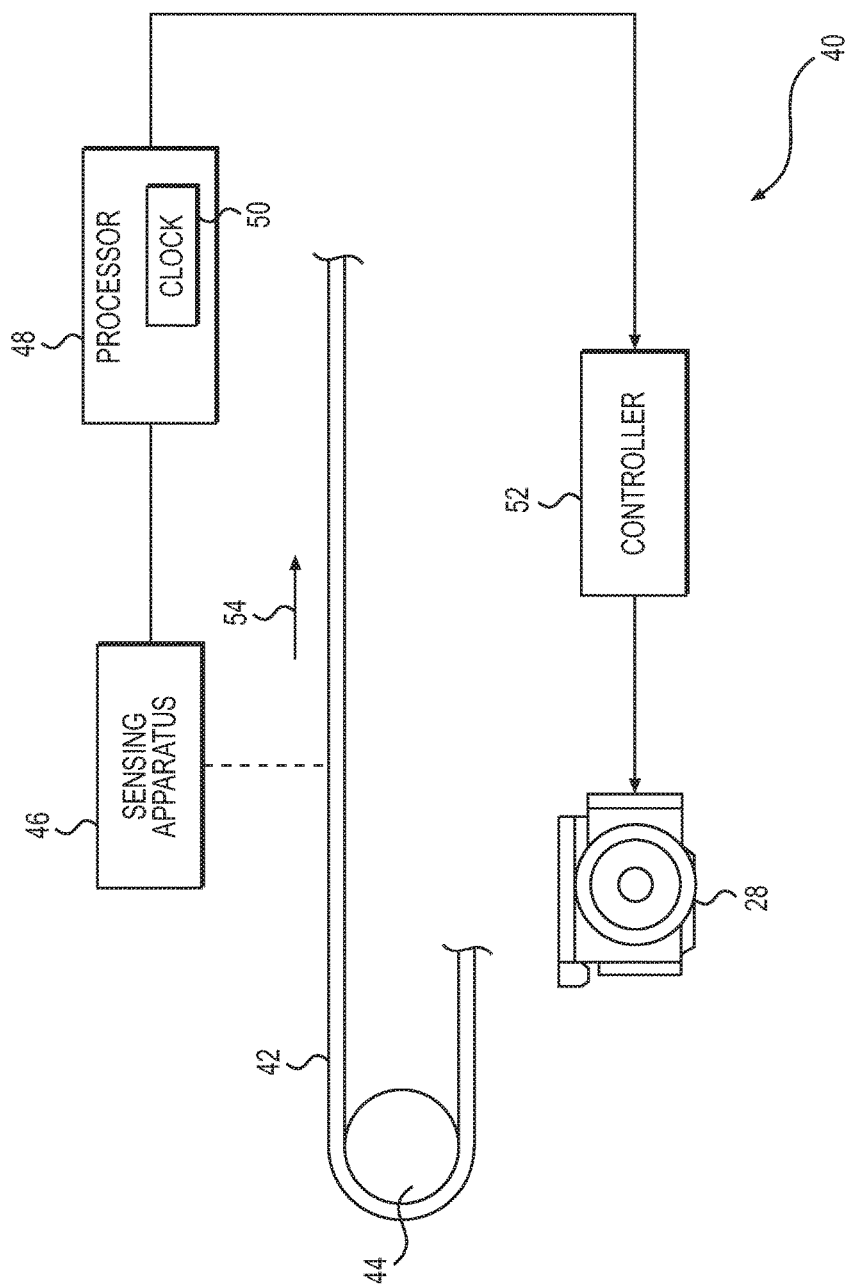
FIG. 5 is a block diagram illustrating a belt speed control system, according to one embodiment.

FIG. 5 is a block diagram showing an embodiment of a belt speed control system 40, which is configured for controlling the speed of a belt 42. A portion of the belt 42, such as a belt of the spiral conveyor system 10, is shown from a side view. The belt 42 is driven by a driving mechanism 44 or the main drive motor 28 (shown in FIG. 2). The belt speed control system 40 further includes a sensing apparatus 46, a processor 48 having a clock 50, and a controller 52. The controller 52 is configured to provide variable power in order to control the speed of the driving mechanism 44 or main drive motor 28.

The driving mechanism 44 or main drive motor 28 is configured to move the belt 42 in a longitudinal direction as shown by arrow 54. The belt 42 comprising a plurality of support portions separated from each other by a plurality of gaps (not shown in FIG. 5). Bridges spanning the gaps are used to connect the support portions together. The sensing apparatus 46 is configured to optically detect the presence of the support portions and gaps when the belt 42 is moved in the longitudinal direction 54. The processor 48 is configured to receive a detection signal from the sensing apparatus 46, the detection signal being indicative of the presence of the support portions and gaps. The processor 48 is further configured to monitor the speed of the belt based on a number of gaps detected over a predetermined amount of time. The controller 52 is configured to receive control signals from the processor 48 and control the operation of the driving mechanism 44 or main drive motor 28 based on the number of gaps detected over the predetermined amount of time.

The controller 52 is configured to increase power to the driving mechanism 44 or main drive motor 28 when the number of gaps detected over the predetermined amount of time is below a first preset number of gaps and is further configured to decrease power to the driving mechanism 44 or main drive motor 28 when the number of gaps detected over the predetermined amount of time is above a second preset number of gaps.

The sensing apparatus 46 may comprise a photoelectric emitter and a photoelectric sensor. In some embodiments, a housing of the sensing apparatus may be configured to contain both the photoelectric emitter and photoelectric sensor. In other embodiments, the photoelectric emitter may be located on one side of the belt 42 while the photoelectric sensor is located on the other side of the belt 42.

The processor 48 may be configured to provide an alarm signal when a detection signal indicates an irregular pattern of detected support portions and gaps. The controller in this scenario may therefore be configured to automatically shut off power to the driving mechanism 44 when the irregular pattern is detected. For example, the irregular pattern may be indicative of a belt slip condition or a belt flip condition.

In some embodiments, the driving mechanism 44 may comprise a motor and a drum, such as tension tower motor and gearbox 16 shown in FIG. 1. The belt speed control system 40 may further be configured such that the controller 52 can adjust the operation of the driving mechanism 44 based on an overdrive condition, which is a factor of the speed of the belt 42 and a detected speed of the drum.

Figure 6A:
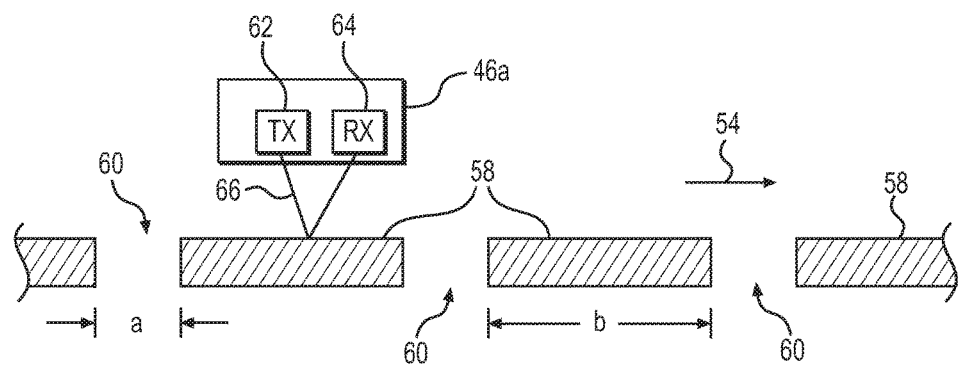
FIGS. 6A and 6B are side views of a belt to be monitored by a first type of sensor apparatus, according to one embodiment.
Figure 6B:
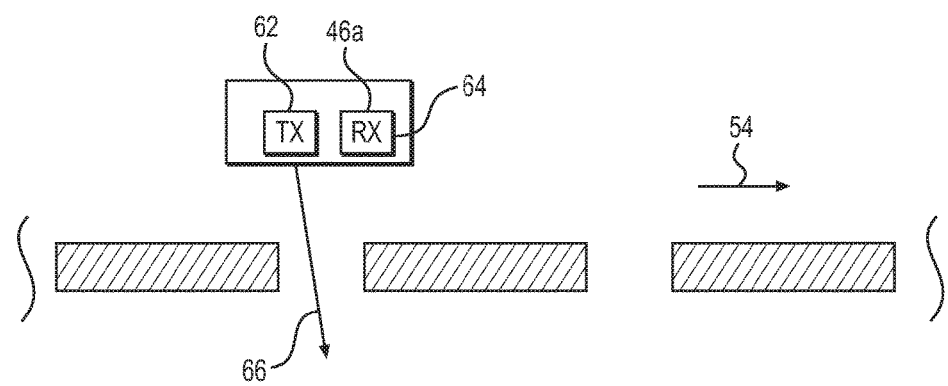

FIGS. 6A and 6B are diagrams each showing a side view of the belt 42 to be monitored by a first sensor apparatus 46a, which may be one embodiment of the sensor apparatus 46 shown in FIG. 5. The belt 42 includes a plurality of support portions 58 configured to support a food product or other object. The support portions 58 are separated from each other by a plurality of gaps 60. As mentioned above, the support portions 58 may be connected to each other by bridges (not shown). The belt 42 is configured to move in a substantially longitudinal direction as indicated by arrow 54.

In this embodiment, the gaps 60 are substantially equal in width, which is designated by the dimension "a." Also, the support portions 58 are substantially equal in width, which is designated by the dimension "b." Preferably, the width "b" will be greater than "a." A third character "c" can be equal to a+b, which defines the width from a leading edge of a first support portion 58 to the leading edge of the next support portion 58. The values a, b, and c will be known or can be measured. The processor 48, or memory associated with the processor 48, may be configured to store the values a, b, and c.

The sensor apparatus 46a in this embodiment may be configured as a reflective sensor, which includes a transmitter 62 and receiver 64 contained within the same housing of the sensor apparatus 46a. The transmitter 62 may include a light transmission device, such as a laser, photoemitter, CMOS, LED, etc. and is configured to continually emit a beam 66 of light in a direction that is substantially perpendicular to the movement direction 54 of the belt 42.

As shown in FIG. 6A, when a support portion 58 is temporarily located under the sensor apparatus 46a and in the path of the light beam 66, the beam 66 reflects off of the surface of the belt 42 and is sensed by the receiver 64. However, as shown in FIG. 6B, when there are no support portions 58 temporarily located under the sensor apparatus 46a, but a gap 60 allows the light beam 66 to pass through the belt 42 without reflection, the beam 66 is not sensed by the receiver 64.

Figure 6C:
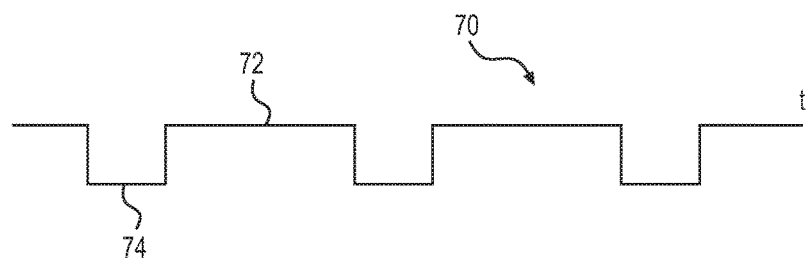
FIG. 6C is a diagram illustrating a signal sensed by the first type of sensor apparatus shown in FIGS. 6A and 6B, according to one embodiment.

FIG. 6C is a diagram illustrating a signal 70 sensed over time (t) by the sensor apparatus 46a shown in FIGS. 6A and 6B. It may be noted that the peak values 72 represent a reflective signal being received by the receiver 64 and the valley values 74 represent when no signal or little reflection is received by the receiver 64. The processor 48 shown in FIG. 5 can count the number of gaps (i.e., valleys 74) from the signal 70 to determine a "gaps/minute" rate, which can be used to indicate the speed of the belt 42. Also, knowing the value of "c" (mentioned above), an indication of feet per second or other rate in distance per time can be provided.

Figure 7A:
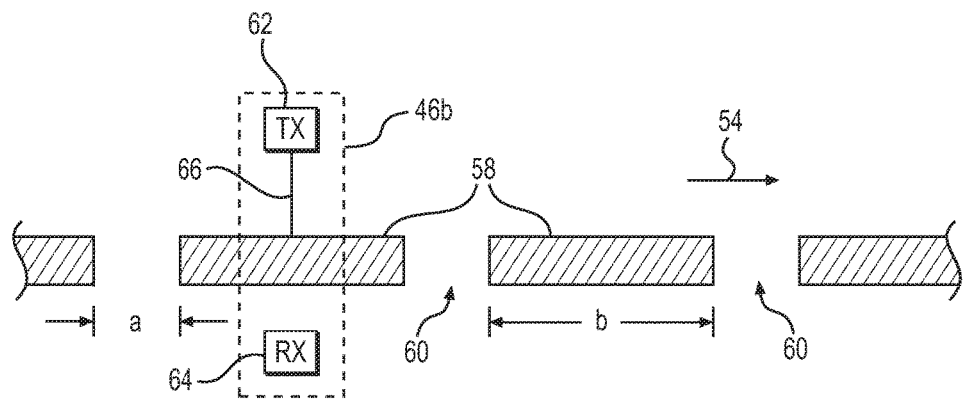
FIGS. 7A and 7B are side views of a belt to be monitored by a second type of sensor apparatus, according to one embodiment.
Figure 7B:
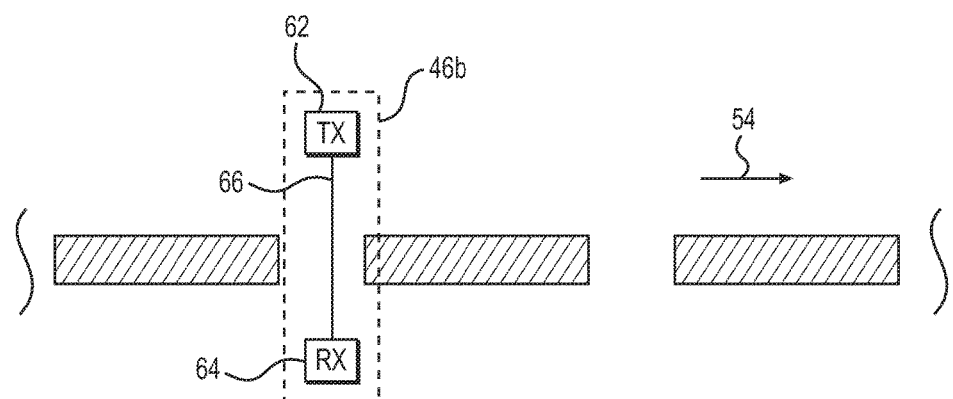

FIGS. 7A and 7B are diagrams showing side views of the belt 42 to be monitored by a second sensor apparatus 46b, which may be an embodiment of the sensor apparatus 46 shown in FIG. 5. Again, the belt 42 includes support portions 58 separated from each other by gaps 60 and is configured to move in a substantially longitudinal direction as indicated by arrow 54.

The sensor apparatus 46b in this embodiment may be configured as a through-beam sensor, which includes the transmitter 62 and receiver 64 contained within separate housings. The transmitter 62 may include a light transmission device, such as a laser, photoemitter, etc. and is configured to continually emit a beam 66 of light in a direction that is substantially perpendicular to the longitudinal movement direction 54 of the belt 42.

As shown in FIG. 7A, when a support portion 58 is temporarily located under the transmitter 62 and thereby blocks the path of the light beam 66, the beam 66 is not able to pass through the gap 60 to reach the receiver 64. However, as shown in FIG. 7B, when there are no support portions 58 temporarily located under the transmitter 62, a gap 60 allows the light beam 66 to pass through the belt 42 to be received by the receiver 64.

Figure 7C:
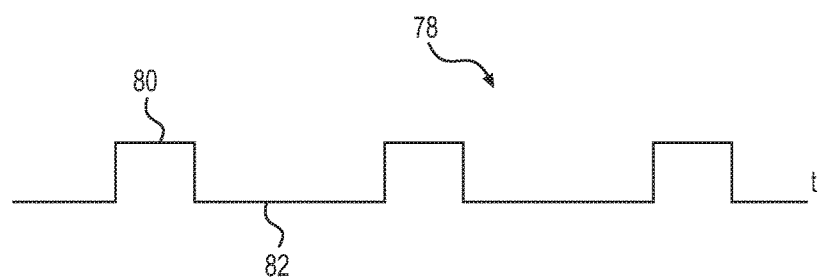
FIG. 7C is a diagram illustrating a signal sensed by the second type of sensor apparatus shown in FIGS. 7A and 7B, according to one embodiment.

FIG. 7C is a diagram illustrating a signal 78 sensed over time (t) by the sensor apparatus 46b shown in FIGS. 7A and 7B. It may be noted that the peak values 80 represent when the beam 66 passes through the gap 60 and is received by the receiver 64 and the valley values 82 represent when the beam 66 is blocked by the support portions 58 and no signal reaches the receiver 64. The processor 48 shown in FIG. 5 can count the number of gaps (i.e., peaks 80) from the signal 78 to determine a "gaps/minute" rate, which can be used to indicate the speed of the belt 42.

Therefore, the present application may be directed to a system for detecting the speed of a belt having a plurality of support portions separated from each other by a plurality of gaps. In some embodiments, the system may include a sensing apparatus 46 configured to optically detect the presence of the support portions 58 and gaps 60 when the belt 42 is moved in a longitudinal direction 54. The system may also include a processing device 48 configured to receive signals from the sensing apparatus 46 indicative of the presence of the support portions 58 and gaps 60. The processing device (e.g., processor 48) may be configured to count the number of gaps detected over a predetermined amount of time. The period of time may be detected by clock 50. The processing device 48 is further configured to determine the speed of the belt 42 based on the number of gaps 60 detected over the predetermined amount of time.

The processing device 48 determines the speed of the belt 42 based on the number of gaps 60 detected over the predetermined amount of time and based on known dimensional characteristics of the belt, such as a known width "a" of each gap 60 measured in the longitudinal direction 54 and a known width "b" of each support portion 58 measured in the longitudinal direction 54. As shown in FIGS. 6C and 7C, the signals received from the sensing apparatus 46 may be square-wave signals.

The system of the present disclosure may include the driving mechanism 44 configured to move the belt 42 in the longitudinal direction 54 and the controller 52 configured to control the operation of the driving mechanism 44 based on the number of gaps 60 detected over the predetermined amount of time. The controller 52 may be configured to increase power to the driving mechanism 44 when the number of gaps 60 detected over the predetermined amount of time is below a first preset number and to decrease power to the driving mechanism 44 when the number of gaps 60 detected over the predetermined amount of time is above a second preset number.

In some embodiments of the system of the present disclosure, the sensing apparatus 46 may comprise a photoelectric emitter (e.g., transmitter 62) and a photoelectric sensor (e.g., receiver 64) arranged in one of a through-beam configuration (FIGS. 6A and 6B), a reflective configuration (FIGS. 7A and 7B), and a presence-detection configuration.

Figure 8:
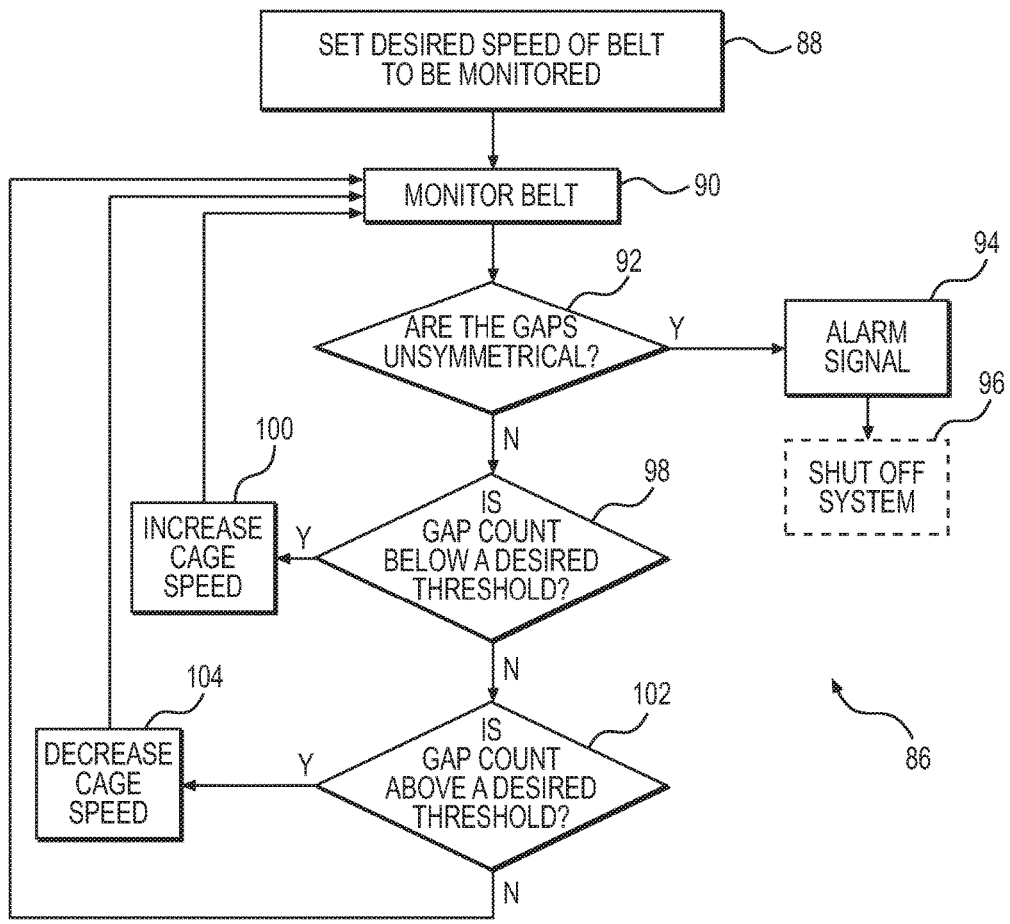
FIG. 8 is a flow diagram illustrating a method for controlling the speed of a belt, according to one embodiment.

FIG. 8 is a flow diagram illustrating an embodiment of a method 86 for controlling the speed of the belt 42. The method may comprise a first step setting a desired speed of the belt 42 to be monitored, as indicated in block 88. For example, based on experience, a technician or manager of a food handling facility may determine that a desired belt speed for optimum operation may be calculated in terms of a gap/minute speed.

The method 86 may also include the step of monitoring the belt, as indicated in block 90. This step may be performed by optically detecting the presence of support portions and gaps of the belt when the belt is moved in a longitudinal direction and counting the number of gaps detected over a predetermined amount of time. The method may then determine the speed of the belt based on the number of gaps detected over the predetermined amount of time. The step of block 90 may further include the step of determining the speed of the belt based on a known width of each gap measured in the longitudinal direction and a known width of each support portion measured in the longitudinal direction.

In some embodiments, the method 86 may further include a step of determining, according to detection diamond 92, whether the gaps are unsymmetrical. In other words, if the gaps 74, 80 are not detected regularly but include sporadic valleys 74 or peaks 80, then a problem with the belt may exist. If unsymmetrical, the method may proceed from detection diamond 92 to block 94, which indicates that an alarm signal can be provided to indicate when an unsymmetrical pattern of support portions and gaps are optically detected. In some embodiments, the method 86 may be further configured to shut off power to the system, as indicated in block 96, to stop the belt. Shutting down the system when the unsymmetrical pattern is detected may help to prevent further damage to the belt and associated equipment. If the gaps are not unsymmetrical, the method 86 proceeds from diamond 92 to detection diamond 98.

The method 86 also includes the step of determining whether or not a gap count is below a desired threshold, as indicated in detection diamond 98. If so, the method includes the step of adjusting an operation of a driving mechanism to increase the speed of the cage for driving the belt. Then, the method 86 returns back to block 90 to continually monitor the belt speed. If the gap count is not below the threshold, the method proceeds to detection diamond 102.

Detection diamond 102 indicates a step of determining if the gap count is above a desired threshold. If this is the case, the method 86 proceeds to block 104, which indicates that the driving mechanism is adjusted to decrease the cage speed. If it is determined in diamond 102 that the gap count is not above the threshold, then it can be determined that the belt speed is within acceptable tolerances and no adjustments are needed. The method at this point returns to block 90 to continue monitoring the belt. It should be noted that monitoring the belt as indicated in block 90 may occur on a periodic basis (e.g., once an hour).

According to some embodiments, the methods of the present disclosure may increase power to a driving mechanism that drives the belt when the number of gaps detected over the predetermined amount of time is below a first preset number and decrease the power to the driving mechanism when the number of gaps detected over the predetermined amount of time is above a second preset number.

The above embodiments are meant to define examples of implementations for monitoring belt speed and are not meant to be limiting. Instead, the detailed description will provide one of ordinary skill in the art opportunities to contemplate alternative embodiments within the spirit and scope of the present disclosure based on a clear understanding of the detailed description.

What is claimed is:

1. A control system for controlling the speed of a belt, the control system comprising:
a driving mechanism configured to move a belt in a longitudinal direction, the belt comprising a plurality of support portions separated from each other by a plurality of gaps;
a sensing apparatus configured to optically detect the presence of the support portions and gaps when the belt is moved in the longitudinal direction;
a processing device configured to receive a detection signal from the sensing apparatus, the detection signal being indicative of the presence of the support portions and gaps, the processing device further configured to monitor the speed of the belt based on a number of gaps detected over a predetermined amount of time; and
a controller configured to receive control signals from the processing device and to control the operation of the driving mechanism based on the number of gaps detected over the predetermined amount of time.

2. The control system of claim 1, wherein the controller is configured to increase power to the driving mechanism when the number of gaps detected over the predetermined amount of time is below a first preset number of gaps and to decrease power to the driving mechanism when the number of gaps detected over the predetermined amount of time is above a second preset number of gaps.

3. The control system of claim 1, wherein the sensing apparatus comprises a photoelectric emitter and a photoelectric sensor.

4. The control system of claim 3, further comprising a housing that houses the photoelectric emitter and photoelectric sensor.

5. The control system of claim 1, wherein the processing device is configured to provide an alarm signal when the detection signal indicates an irregular pattern of detected support portions and gaps.

6. The control system of claim 5, wherein the controller is configured to automatically shut off the driving mechanism when the irregular pattern is detected, the irregular pattern being indicative of a belt slip condition or a belt flip condition.

7. The control system of claim 1, wherein the driving mechanism comprises a motor and a drum.

8. The control system of claim 7, wherein the controller is configured to adjust the operation of the driving mechanism based on the speed of the belt and a detected speed of the drum.

9. A system for detecting the speed of a belt having a plurality of support portions separated from each other by a plurality of gaps, the system comprising:
a sensing apparatus configured to optically detect the presence of the support portions and gaps when the belt is moved in a longitudinal direction; and
a processing device configured to receive signals from the sensing apparatus indicative of the presence of the support portions and gaps, the processing device further configured to count the number of gaps detected over a predetermined amount of time;
wherein the processing device is further configured to determine the speed of the belt based on the number of gaps detected over the predetermined amount of time.

10. The system of claim 9, wherein the processing device determines the speed of the belt based on the number of gaps detected over the predetermined amount of time and based on known dimensional characteristics of the belt.

11. The system of claim 10, wherein the known dimensional characteristics of the belt include a known width of each gap measured in the longitudinal direction and a known width of each support portion measured in the longitudinal direction.

12. The system of claim 9, wherein the signals received from the sensing apparatus are square-wave signals.

13. The system of claim 9, further comprising:
a driving mechanism configured to move the belt in a longitudinal direction; and
a controller configured to control the operation of the driving mechanism based on the number of gaps detected over the predetermined amount of time;
wherein the controller is configured to increase power to the driving mechanism when the number of gaps detected over the predetermined amount of time is below a first preset number and to decrease power to the driving mechanism when the number of gaps detected over the predetermined amount of time is above a second preset number.

14. The system of claim 9, wherein the sensing apparatus comprises a photoelectric emitter and a photoelectric sensor arranged in one of a through-beam configuration, a reflective configuration, and a presence-detection configuration.

15. A method comprising the steps of:
   optically detecting the presence of support portions and gaps of a belt when the belt is moved in a longitudinal direction;
   counting the number of gaps detected over a predetermined amount of time; and
   determining the speed of the belt based on the number of gaps detected over the predetermined amount of time.

16. The method of claim 15, wherein the step of determining the speed of the belt is further based on a known width of each gap measured in the longitudinal direction and a known width of each support portion measured in the longitudinal direction.

17. The method of claim 15, further comprising the steps of:
   increasing power to a driving mechanism that drives the belt when the number of gaps detected over the predetermined amount of time is below a first preset number; and
   decreasing the power to the driving mechanism when the number of gaps detected over the predetermined amount of time is above a second preset number.

18. The method of claim 15, further comprising the step of:
   providing an alarm signal when an irregular pattern of support portions and gaps are optically detected.

19. The method of claim 18, further comprising the step of:
   stopping the movement of the belt when the irregular pattern is detected.

20. The method of claim 15, further comprising the steps of:
   adjusting an operation of a driving mechanism configured to move the belt, the driving mechanism comprising a motor and a drum; and
   detecting a speed of the drum;
   wherein the step of adjusting the operation of the driving mechanism is based on the speed of the belt and the detected speed of the drum.

\* \* \* \* \*